A. D. RAMSEY.
TRAP.
APPLICATION FILED MAY 21, 1914.
1,179,557.
Patented Apr. 18, 1916.
2 SHEETS—SHEET 1.
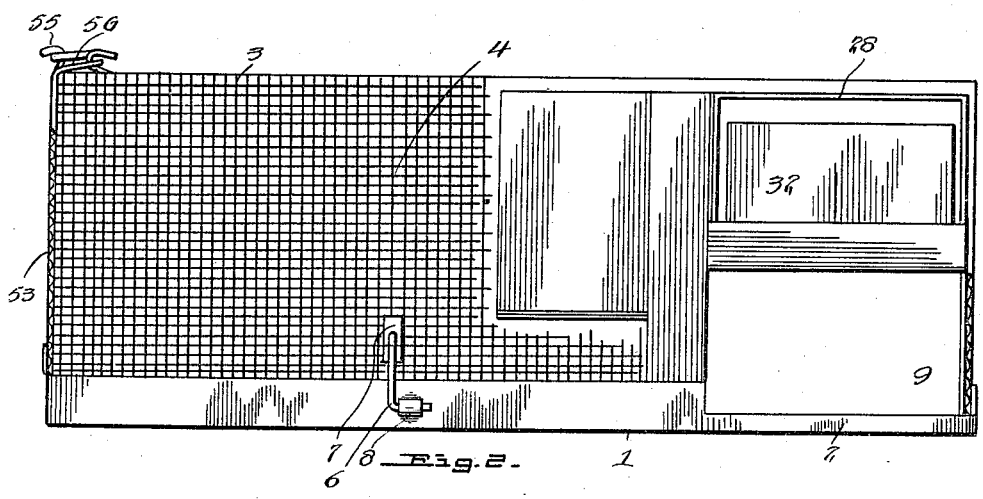
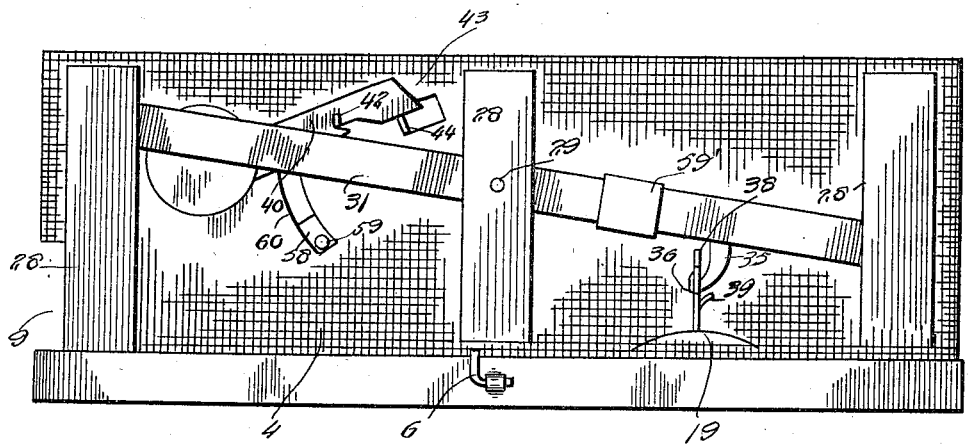
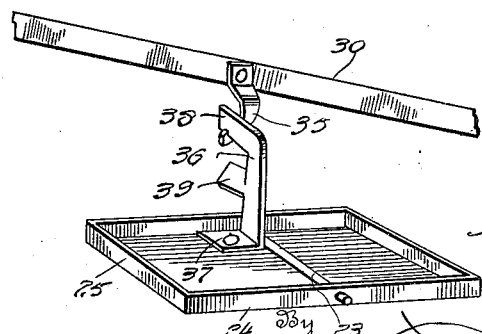

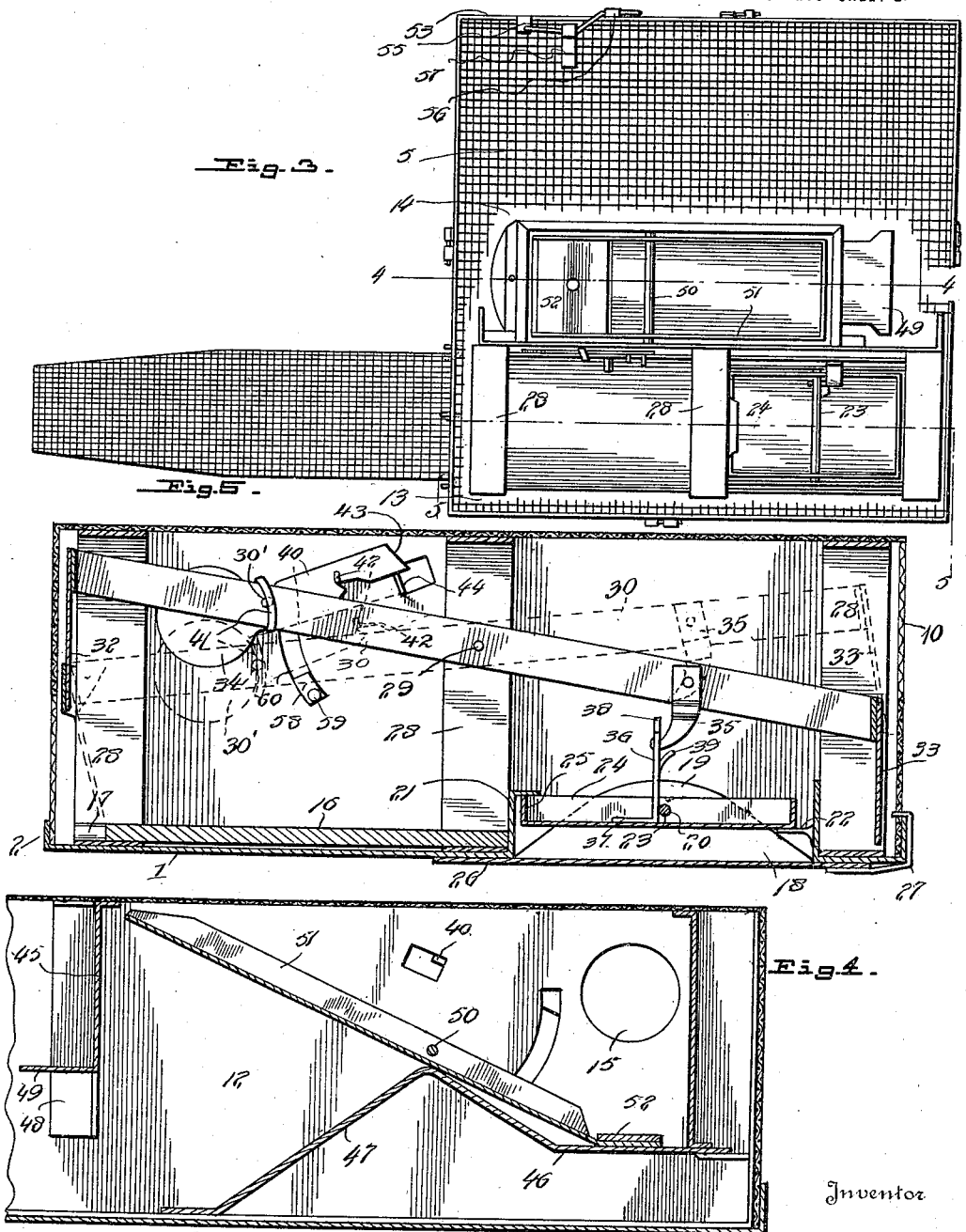

UNITED STATES PATENT OFFICE.

ALONZO D. RAMSEY, OF SEDALIA, TENNESSEE.

TRAP.

1,179,557.  Specification of Letters Patent.  Patented Apr. 18, 1916.

Application filed May 21, 1914. Serial No. 840,045.

*To all whom it may concern:*

Be it known that I, ALONZO D. RAMSEY, a citizen of the United States, residing at Sedalia, in the county of Hancock, State of Tennessee, have invented certain new and useful Improvements in Traps; and I do hereby declare the following to be a full, clear, and exact description of the invention, such as will enable others skilled in the art to which it appertains to make and use the same.

This invention relates to an animal trap.

An object of the invention is to provide a device which after the animal has entered will automatically close so as to retain it within said trap.

A further object of the invention is to provide for the encaging of animals which have entered the trap in such a manner as to cause them to automatically reset the trap.

With these and other objects in view, such as will appear as the description progresses, my invention comprises the combination and arrangement of parts as herein set forth and subsequently claimed.

Referring to the drawings:—Figure 1 is a front elevation of my device, showing the entrance opened, part of the wire covering being broken away. Fig. 2 is a side elevation of the device with parts thereof broken away to show the operating mechanism more clearly. Fig. 3 is a top plan view of my device. Fig. 4 is a section on the line 4—4 of Fig. 3. Fig. 5 is a section on the line 5—5 of Fig. 3. Fig. 6 is a detail showing the catch for holding the entrance doors in open positions.

Referring to the drawing by reference characters which indicate similar parts throughout the several views: My device comprises a base 1 made of metal or other suitable material having a flange 2 extending upwardly therefrom. Detachably mounted on the base is a rectangular cage 3 resting on the said base on the inside of the flange 2, said cage comprising upwardly extending walls 4 and a horizontal top 5 which are made of wire or other such material. This cage is secured to the base by hooks 6 on each of the said walls 4 which are pivotally secured thereto by clips 7 and which engage loops 8 struck from the flanges 2. In the front wall 4 and in the lower corner thereof is a doorway 9 and directly opposite the said doorway 9 in the rear wall 4 thereof and adjacent the upper corner of the said wall is a second door 10, the purpose of which will be hereinafter apparent.

Attached to the base by a flange is a vertical wall 12 extending upwardly within the cage and contacting with the top thereof to divide the cage into two compartments 13 and 14, the doors 9 and 10 being arranged in compartment 13. Leading through this wall and connected with said compartments is a circular aperture 15 spaced from the base 1 through which the animal after having entered through either of the doors 9 and 10 may pass into the compartment 14 where it will be retained until removed.

To the portion of the base 1 within compartment 13 is a wooden runway 16 which is attached to the said portion of the base by virtue of its engagement with a flange 17 which is driven up into the said runway. This runway covers practically one-half of the portion of the base described. The other parts of this portion of the base 1 within the compartment 13 is apertured, as at 18, and the material which is struck from said aperture is bent outwardly at the sides, as at 19, to form bearings 20 and at the front and rear to form flanges 21 and 22. In these bearings 20 is pivotally mounted on the axle 23 a bait tray 24 having upstanding flanges 25 formed thereon, the upward movement of the forward end of this tray is limited by the flange 21 which coöperates with the flange 22 on which the rear end of the said tray rests and limits the downward movement of the rear end of the tray.

Pivoted to the under side of the base 1 is a tray 26 directly beneath the aperture 18 and adapted to close the same and is detachably held in position by a hook 27 extending upwardly over the flange 2 of the base 1.

Attached to the base 1 and to the vertical wall 12 are inverted U-shaped braces 28 within the compartment 13. To the middle brace is secured a pair of trunnions 29 on which trunnions are pivotally mounted levers 30 and 31, on one end of which levers is mounted a door 32 to close the entrance in the front wall of the device, while on the rear ends of these levers is mounted a door 33 to close the entrance in the rear wall 4. On the lever 30 near the forward end thereof is secured an enlargement 34 which when the forward door is in its open position closes the aperture 15 and prevents the entrance of an animal through the said aperture into compartment 14. On the rear end of this lever 30 is formed an outwardly extending hook member 35, which coöperates with an upstanding catch 36 secured by a flange 37 to the tray member 24. This catch 36 has an outwardly projecting portion 38 under which the hook 35 catches. In order that this hook may be guided beneath the said portion 38 this catch is further provided with an inclined flange 39 which engages the under portion of the hook and rotates the tray about its axis to cause the hook to engage beneath the projection 38.

In order that the doors 32 and 33 may be kept in their closed positions, I have pivotally mounted on the forward end of the lever 30 at 30' an arm 40 having a limiting member 41 encircling the lever 30 and limiting the movement of the said arm in its upward direction. Projecting from this member 40 is a lug 42 which contacts with the upper edge of the lever 30 to limit the downward movement of the said arm. The outer end of this arm is beveled, as at 43, and coöperates with a lug 44 struck from the vertical wall 12 to prevent the forward end of the lever from swinging upwardly, and thus holding the doors in their closed positions.

Secured to the vertical wall 12 within the compartment 14 is a box-like member 45 having the bottom portion thereof spaced from the base 1. Secured to one end of this member 45 is a bottom 46, which closes the bottom portion of the said member 45 for approximately half of its distance and then extends downwardly and is secured to the base 1 to form a race-way 47. The end of the member 45 adjacent the said race-way 47 is notched, as at 48, and has an outwardly projecting flange 49 extending from the upper edge of said notch. Pivoted within the member 45 on a pivot 50 which is mounted in the wall of the said member 45 and in the member 12 is a platform 51 having a counter-weight 52 on one of its ends to hold the said platform in operative position. On the platform 51 is an outwardly projecting lug 58 having a roller 59 mounted thereon and extending through an arcuate slot 60 in the vertical wall 12 and adapted to coöperate with the lower portion of the lever 30 to throw the said lever into its inoperative position when the platform 51 is actuated in one direction about its pivot. In connection with the lug 58 and the roller 59 it is pointed out that the lug 58 extends through the slot 60 far enough to engage the latch 40 but not far enough to engage the lever 30 so that upon the upward movement of the lug 58 the latch 40 will be first slightly raised and then the lever 30 will be engaged by the roller 59 and raised.

In the side 4 of a portion of the cage surrounding the compartment 14 is a door 53 pivotally secured thereto and having on its upper edge a pivoted lever 55 and a hook 56. On the top of the cage adjacent this door is secured a second hook 57. When it is desired to return this door to its closed position, the lever is engaged beneath the hook 57 and swung around and engaged beneath the hook 56, thus securely retaining the said door in its closed position.

Assuming that the device is in its set position and that the doors 9 and 10 are open and the enlargement 52 closing the aperture 15 in the vertical wall 12 the animal enters through the door way 9 and proceeds to the pivoted tray 24 on which bait has been previously placed. As it steps upon the forward end of this tray the said tray is rotated about its pivot 23 and the hook 35 released from the catch 38 and the levers 30 and 31 allowed to oscillate about their pivots to close the entrance through both the front and rear walls of the doors 9 and 10. Simultaneously the aperture 15 is opened by the enlargement 34 being withdrawn therefrom and the doors 9 and 10 are locked in their closed positions by the engagement of the beveled face 43 of the arm 40 with the lug 44 on the vertical wall 12.

The animal in endeavoring to escape passes through the aperture 15 on to the lower end of the platform 51 and as it ascends this platform to the upper end thereof its weight causes the said platform to rotate about its pivot and the animal is precipitated into the compartment 14 through the opening 48 in the end of the member 45. During this operation of the platform 51 the lug 58 engages the arm 40 and lifts the same from its engagement with the projection 44 and on its continued upward movement then engages the lever 30 and moves the same upwardly, thus opening the doors 9 and 10 and simultaneously closing the aperture 15. In connection with the operation of the levers 30 and 31 and the arm 40, it is pointed out that when the parts are in the full line positions shown in Fig. 5 of the drawing and the hook 35 is disengaged from the latch member 38, the levers 30 and 31 will move about the pivot 29 so that the door 33 will be raised and the door 32 lowered, this movement being caused because of the fact that the end of the levers on which the door 32 is mounted is heavier because of the presence of the arm 40. During this movement of the levers 30 and 31 the arm 40 will move about its pivot 30', being at the same time moved downwardly by the levers, until the free end of the arm slides off of the upper edge of the lug 44. The member 41 will not limit the movement of the lever until the said free end has passed beyond the lug. When the free end is disengaged from the lug 44 the beveled face of the free end will engage the lower edge of the said lug as shown in the dotted line positions in Fig. 5 of the drawing. This arm 40 will at this time prevent the upward movement of the levers 30 and 31 because of the fact that the lug 42 bears against the upper edge of the lever 30 and further because of the fact that any movement of the levers to raise the door 32 would necessarily have to occur about the pivot 29. This movement would tend to draw the free end of the arm 40, that is, the beveled end more firmly into engagement with the lug 44 as will be readily appreciated. Now when the lug 58 engages the lower edge of the arm 40 it will move the arm about the pivot 30', the levers 30 and 31 remaining stationary. The end of the arm 40 will follow the path indicated in construction lines in Fig. 6 of the drawing and will move away from the lug 44 until it is entirely disengaged therefrom. At this time the lug 58 will come into contact with the lower edge of the lever 30 and any movement thereafter will raise the levers 30 and 31 to raise the door 32 until the free end of the arm 40 again rests upon the upper edge of the lug 44. When these doors have reached their open positions the hook 35 engages a latch member 38 and retains them in such position, the hook being guided into its engaging position by the member 39 on the said latch member 38. At this point the end of the arm 40 rests upon the projection 44 and is in inoperative position. The platform 51 after it has been relieved of the weight of the animal oscillates about its pivot by virtue of the counter-weight 52 and closes the race-way 47 leading to the compartment 14 so that the animal is retained in said compartment. When it is desired to remove the animal from this compartment it is only necessary to unlatch the door 53 and it may be readily removed.

While I have described the operation of the device when an animal enters through the door 9 it is to be understood that should the animal enter through the door 10 as soon as it treads upon the forward end of the tray 24 the mechanism is actuated and the operation is identical to that above described.

In order that the movement of the levers 30 and 31 on which the doors 9 and 10 are mounted may be controlled, I have provided a governor 59' which is slidable on the lever 31 and by the adjustment of which the relative weights of the lever arms may be varied.

The portion of the base surrounding the bait tray 24 is trough-shaped so as to prevent any material portion of the bait entering beneath the tray to prevent its operation, but should any of the material be forced beneath the said tray it is only necessary to open the slide beneath this tray and the material may be readily removed, thus allowing the tray to again rotate.

It is some times desirable to use this trap to catch an animal as it comes from its hole and in order to facilitate such catching, I have provided a run-way made of wire mesh detachably secured to the forward wall 4 of the cage so that its inner end will coincide with the entrance 9 and the opposite end may be inserted in the hole so that as the animal comes from the said hole it will be guided directly into the trap.

From the foregoing description it may be seen that I have provided a device which will allow the animals to enter, but will prevent their escaping therefrom, and I have further provided for the operation of this device to close the doors by the weight of the animal encaged. I have still further provided a device of simple and efficient construction which may be readily disassembled and cleaned as it becomes necessary.

I do not wish to be limited to the particular construction of my device disclosed, for it is obvious that numerous mechanical changes may be made within the scope of the invention as defined by the claims.

What is claimed is:—

1. A trap comprising a base, a cage detachably secured thereto and extending upwardly therefrom, a vertical wall attached to said base and dividing the cage into two compartments, an entrance formed in one of the compartments, levers pivotally supported within the cage, a door secured to the ends of said levers and adapted to close the entrance aforementioned, a tray pivotally secured in the said compartment, a catch on said tray, a hook on one of said levers coöperating with said catch, said vertical wall having an aperture therethrough, means on the lever to close said aperture when the hook is in engagement with the catch, a platform pivotally secured within the other compartment and in communication with the aperture aforementioned, and means to hold said platform in such position as to prevent access to the aperture afore-mentioned.

2. In a device of the class described, a cage having an entrance in one side thereof, levers pivoted within the cage, a door secured to said levers for closing the entrance, a partition within the cage to divide the same into two compartments and having an aperture leading from one compartment to the other, means on one of said levers for closing said aperture, means for coöperating with the last mentioned lever to operate it so as to open the said aperture, an arm beveled on the said lever for holding the means for closing the aperture in inoperative position, said arm having an inclined edge for operating with a lug on the vertical wall to prevent upward movement of the lever.

3. In a device of the class described, a cage of rectangular formation, a vertical wall dividing the cage into two compartments and having an aperture therein in communication with each compartment, an entrance in one of said compartments and means for closing the same, a lever pivotally secured to said vertical wall and having an enlargement on one end thereof to close said aperture, a hook on the other end thereof, a catch for engaging said hook to hold said enlargement in operative position, means for releasing said catch to open said aperture, a platform pivotally secured in the other compartment in communication with said aperture and being inclined upwardly therefrom so that when weight is applied to its outer end it will be oscillated about its pivot, a projection formed thereon and extending through the vertical wall and in engagement with the said lever to move the enlargement thereon into operative position to close the aperture when the free end of the platform is moved downwardly.

4. In a device of the class described, a rectangular cage, a vertical wall dividing the same into two compartments, doorways leading into one of said compartments, doors for closing said doorways, levers mounted in the said compartments and attached to the said doors, a tray pivoted below the said levers and having an upwardly extending latch thereon, a hook coöperating with said latch to hold the levers in such position that the doors carried thereby will be inoperative, an aperture in the vertical wall, an enlargement on one of the levers for closing the said aperture when the doors are in inoperative position, an arm on said lever arranged to maintain the doors in operative position, a platform pivoted in the other compartment and in communication with the aperture, a counter-weight on said platform, a projection on the platform coöperating with the lever to raise the same and with the arm thereon to throw it into inoperative position when force is applied to the free end of said platform.

5. In a device of the class described, a trap comprising a base and a cage member detachably secured thereto, an entrance in one wall of said last mentioned member, a run-way detachably secured to said entrance, and arranged so as to guide an animal into the said entrance, a vertical partition within the cage, an aperture within the partition, means for closing the said aperture, means for holding it in its closed position, means for throwing the said closing means in inoperative position, and means for locking said closing means in such position, a platform pivotally secured within the cage and in communication with the aperture construction and arranged to prevent access to the said aperture when the closing means is in inoperative position.

In testimony whereof, I affix my signature, in the presence of two witnesses.

ALONZO D. RAMSEY.

Witnesses:
B. J. RAMSEY,
OLIN W. JONES.

Copies of this patent may be obtained for five cents each, by addressing the "Commissioner of Patents, Washington, D. C."